Jan. 18, 1949.   J. C. CHAMBERLAIN   2,459,363
AUTOMATIC TRANSMISSION
Filed April 11, 1947   3 Sheets-Sheet 1
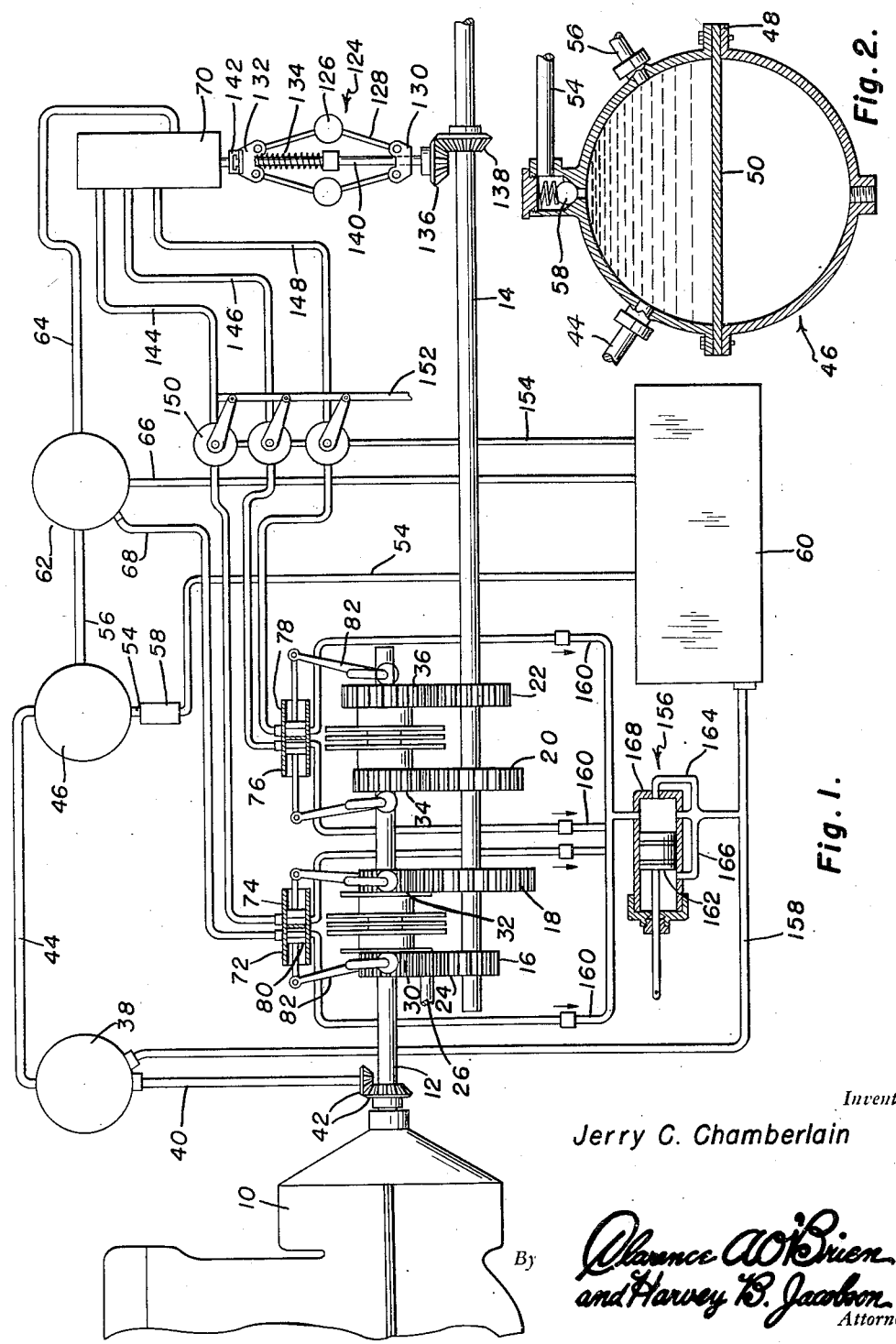
Inventor
Jerry C. Chamberlain
By Clarence A. O'Brien
and Harvey B. Jacobson
Attorneys Jan. 18, 1949. J. C. CHAMBERLAIN 2,459,363
AUTOMATIC TRANSMISSION
Filed April 11, 1947 3 Sheets-Sheet 2

Inventor
Jerry C. Chamberlain

By Clarence A. O'Brien
and Harvey B. Jacobson
Attorneys

Jan. 18, 1949. J. C. CHAMBERLAIN 2,459,363
AUTOMATIC TRANSMISSION
Filed April 11, 1947 3 Sheets-Sheet 3
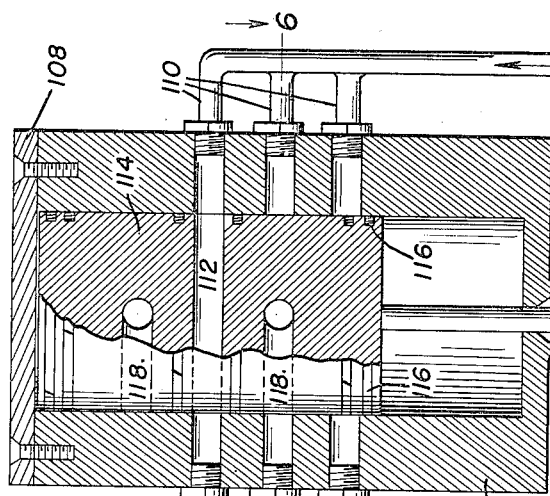
Fig. 5.
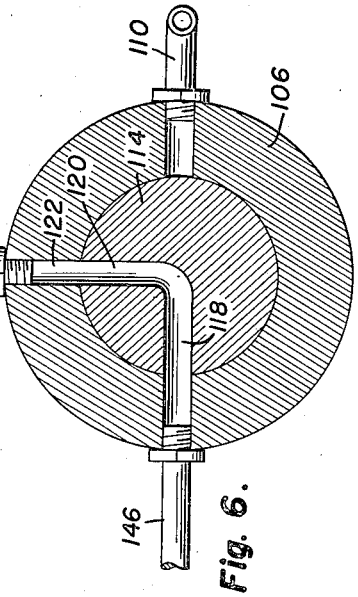
Fig. 6.
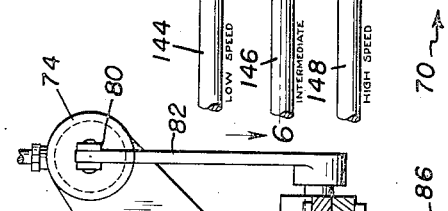
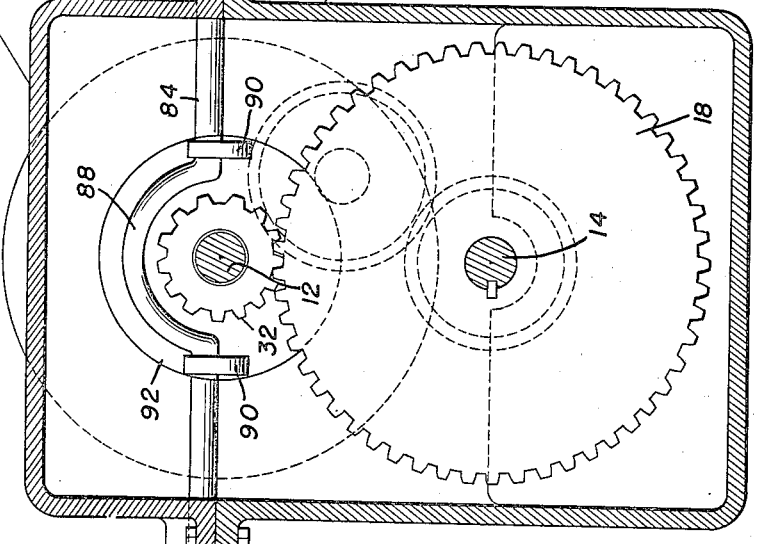
Fig. 4.
Inventor
Jerry C. Chamberlain
By Clarence A. O'Brien
and Harvey B. Jacobson
Attorneys Patented Jan. 18, 1949

2,459,363

UNITED STATES PATENT OFFICE 2,459,363

AUTOMATIC TRANSMISSION

Jerry C. Chamberlain, Phoenix, Ariz., assignor of one-fourth to H. S. Chamberlain and one-fourth to Dorothy Chamberlain, both of Phoenix, Ariz.

Application April 11, 1947, Serial No. 740,949

3 Claims. (Cl. 74—336.5)

This invention relates generally to automatic transmissions, and more particularly to a hydraulic gear shift for variable speed gearing, including reverse gearing, of the type used in automotive vehicles.

The primary object of this invention is to provide means whereby substantially standard gearing of automotive vehicles will be automatically shifted to the proper gear ratios for all forward speeds, the device including a three-way valve which may be manually shifted to provide for forward, reverse and neutral positioning of the gears.

Another object of this invention is to provide means whereby a substantially constant pressure on the hydraulic fluid of this control system is conveniently obtained.

Another object of this invention is to combine a plurality of clutches with the different gears, a governor controlled selector valve, by-passing valves and a pressure accumulator in a novel manner.

And a last object to be specifically mentioned is to provide a device of this character which is relatively inexpensive and practicable to manufacture, extremely simple and convenient to install and use, and which will give generally efficient and durable service.

With these objects definitely in view, this invention resides in certain novel features of construction, combination and arrangement of parts and portions as will be hereinafter described in detail, and particularly set forth in the appended claims, reference being had to the accompanying drawings which form a material part of this application, and in which:

Figure 1 is a view of the assembled invention, together with portions of the environment wherewith this invention is to be used, the view being diagrammatic in character and proposed to amplify the disclosure of this invention;

Figure 2 is a vertical cross sectional view of the pressure accumulator;

Figure 4 is a vertical cross sectional view, taken on the line 4—4 of Figure 3;

Figure 5 is a vertical sectional view of the selector valve; and

Figure 6 is a horizontal sectional view of the selector valve, taken on the line 6—6 in Figure 5.

Similar characters of reference designate similar or identical parts and portions throughout the specification and throughout the several views of the drawings.

Figure 3:
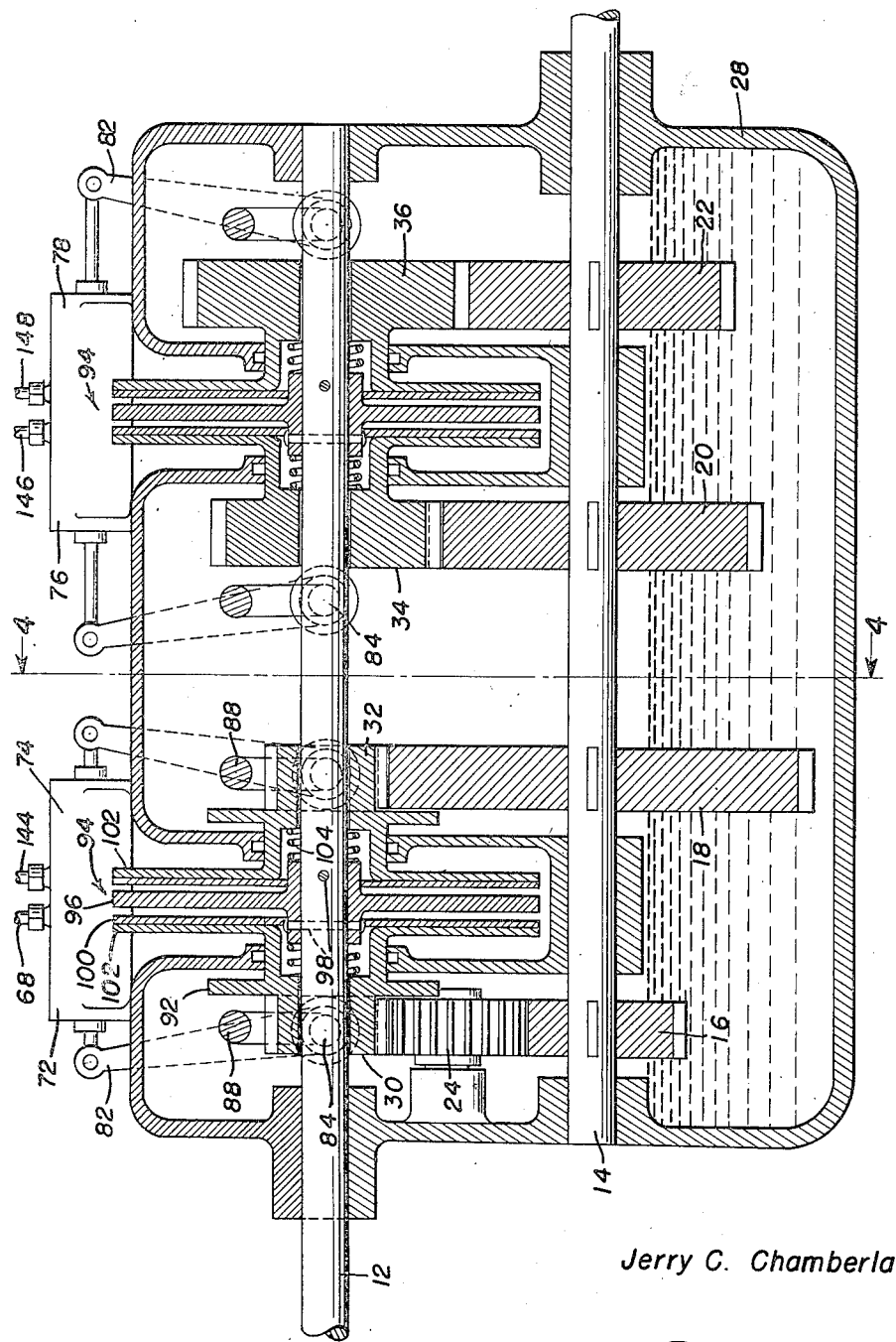
Figure 3 is an enlarged vertical sectional view of the gears and clutch mechanism, enclosed in a gear box.

Referring now to the drawings in detail, it will be noted that the environment wherewith this invention is to be used includes a prime mover 10 and a drive shaft 12, together with a driven shaft 14, on which is secured the reverse gear wheel 16, the low gear wheel 18, the intermediate gear wheel 20, and the high gear wheel 22. The reverse gear idler gear wheel 24 is shown mounted on a broken shaft 26, and it will be understood that the above gears and portions of the drive shaft 12 and the driven shaft 14 are mounted in suitable bearings within a gear box 28, represented in Figure 3. The drive shaft is provided with corresponding gear wheels 30, 32, 34 and 36 which are in continuous engagement with the reverse and forward speed gears referred to above.

A hydraulic pump 38 is operatively connected by means of a drive shaft 40 and co-acting beveled gears 42 associated with the engine drive shaft 12, to pressurize fluid in the conduit 44 which is connected to one side of the pressure accumulator 46. The construction of this pressure accumulator will be clearly understood if reference is had to Figure 2, wherein it is shown that the accumulator is in two halves, each ordinarily of semi-spherical form and provided with annular flanges 48 which are secured together by bolts. A flexible diaphragm 50 is secured between the flanges 48 to divide the pressure accumulator into two halves, the space on one side of this diaphragm being filled with the predetermined quantity of air, and the hydraulic fluid being led into the other half of the accumulator through the conduit 44. Two outlets 54 and 56, are provided and it should be noted that the outlet 54 is provided with a one-way valve 58 and that the elasticity of the air contained in the accumulator functions to maintain a suitable pressure upon the fluid in the other half of the accumulator.

The outlet 54 is connected to a reservoir 60. The other outlet 56 is connected to a three-way valve 62, while the lines 64, 66 and 68 connect the three-way valve to the selector valve 70, the reservoir 60, and the cylinder 72, respectively.

This cylinder 72 is similar to the other cylinders 74, 76 and 78 and in each cylinder is mounted a piston 80, the piston rod of which is connected to a lever 82, as best represented in Figure 4. The cylinders are arranged in two pairs with a dividing wall disposed between the cylinders of each pair.

Since each of these cylinders, pistons, lever 82 and the portions connected thereto and now about to be described in detail are similar, one such assembly will be described. If Figure 4 is considered to be a view taken on a vertical line adjacent the low gear wheel 18 and looking toward the left in Figure 1, it will be evident that the levers 82 are secured to the ends of shafts 84 which are mounted in the sides 86 of the gear box 28. The center portions of these shafts 84 are arcuately upset as at 88, to clear the drive shaft 40 and in the construction illustrated also to clear the gear wheel 32, and are provided with cam members 90 adapted to frictionally engage the annular flange plate portion 92 of the clutch assembly 94. In this connection, it should be noted that the clutch mechanisms will include dry clutch plates 96 which are rigidly secured, as by the bolts 98, to the drive shaft 12 and co-acting friction plates 100 are secured to plates 102 which may be formed integrally with the portions 92, the major portions of the clutch mechanism being recessed into the part of the gear box 86, as well illustrated in Figure 3. From the foregoing, it will be evident how the actuation of the levers 82 will cause the cams 90 to force the friction plates 100 against the plate 96, to engage the drive shaft 12 with the driven shaft 14 through the medium of the gears concerned, as for example, the gears 32 and 18. The essential elements of these clutch mechanisms will also include clutch release springs 104 which may be compressed between the inner surface of the plates 92 and the end of the hub portion of the friction plate 96.

A suitable selector valve for use in this invention is represented in Figure 5, and includes a cylindrical casing 106 having a removable cap 108. It will be noted that the inlet 64 communicates with three branches 110 leading to the bore of the valve, and three registering outlets, named according to their connection in Figure 5, are selectively connected by the transverse channel 112 in the valve plunger 114. The plunger 114 is provided with sealing rings 116 and two channels 118 extend from one side of the plunger to the center thereof and bent at right angles, as at 120, to communicate with bleed ports 122 which communicate with the by-pass 123, in order to relieve the pressure on the opposite side of the piston 80 when pressure is applied to the base portion of the pistons in engaging the corresponding clutch, these bleed ports being effective also in allowing the reverse flow of fluid into the lines when the clutch is actuated by the springs 104.

The detailed construction of the governor, generally represented at 124, is immaterial in this application, but will ordinarily include fly weights 126, toggle links 128 connected to a fixed collar 130 and a sliding collar 132, and a spring 134. It is to be understood that the governor is provided with a beveled gear 136 which is arranged to be in constant engagement with a beveled gear 138 rigidly secured to the driven shaft 14 and the sliding collar 132 is engaged, in any suitable manner, with the end 142 of the plunger 114.

Variations in the speed of rotation of the driven shaft 14 will, therefore, cause the adjustments of the selector valve to connect the inlet 64 selectively with the low speed outlet 144, the intermediate speed outlet 146 or the high speed outlet 148, these outlets being connected with the corresponding cylinders 74, 76 and 78.

By-pass valves 150 are provided in each of the outlet lines, and these valves may have a common control 152 which will ordinarily be connected to the clutch pedal lever of the automotive vehicle whereon this invention is installed, to allow the instantaneous declutching of the driving gears, whereby these valves are adjusted to communicate the said outlets with the reservoir 60, through the tube 154. In order to allow the hydraulic fluid to escape from the cylinder on the side of the piston opposite to that whereon pressure is applied when the clutch is engaged another by-pass valve, generally indicated by the numeral 156, is connected between a line 158 communicating the reservoir 60 with the pump 38 and the four lines 160 connecting the opposite side of this by-pass valve 156 with the cylinders 72—78. The operation of this by-pass valve 156 is of a simple character since it serves merely to open or close connection between the tubes 160 and the tube 158. When the plunger 162 is in the position shown in Figure 1, none of the clutches may be engaged, but when the plunger is moved as to the right in Figure 1, the clutches may be selectively engaged. The short line 164 and 166 is provided in this by-pass valve in order to allow transference of hydraulic fluid from one end of the cylinder 168 to the other end of the same cylinder.

The operation of this invention will be clearly understood from a consideration of the foregoing description of the mechanical details thereof, taken in connection with the above recitation of the objects sought to be achieved by this invention but, it may be added that hydraulic fluid is taken from the reservoir by the engine driven pump 38 which forces this fluid into the accumulator 46. From the accumulator the fluid passes through the one-way valve 58, which will ordinarily be controlled by a foot pedal, and/or the three-way valve 62 which will be located on the instrument panel or the steering column of the automotive vehicle. The fluid is directed by this three-way valve to either the reverse gear cylinder 72, to the reservoir 60 when it is desired to have the vehicle in neutral gear position, or to the selector valve 70. For starting and continued driving in a forward direction, the three-way valve is placed in starting position, that is, with the valve opened toward the selector valve 70, and the governor 124 will become operative in determining what gear ratio will be used, the change from low to high gear, and from high to low gear when the load is increased being completely controlled by the action of this governor. Declutching is made possible at any time, as fully described above, and in other respects an automotive vehicle equipped with this invention may be operated in normal fashion.

Though there has been shown a particular embodiment of this invention, this application is not limited to this particular embodiment, but it is desired to include in the scope of the invention, the construction, combination and arrangement of parts and portions substantially as set forth in the appended claims.

What I claim is:

1. A hydraulic gear shift for variable speed gearing including a source of pressurized fluid connected to a selector valve, clutches operatively associated with gearing and having the selective engagement thereof controlled by said selector valve, and a governor controlling said selector valve, said source being connected to a reservoir for said fluid, said gearing including reverse gears, and a three-way valve operable to direct said pressurized fluid selectively to said reservoir, to the one of said clutches associated with said reverse gears, and to said selector valve.

2. A hydraulic gear shift for variable speed gearing including a source of pressurized fluid connected to a selector valve, clutches operatively associated with gearing and having the selective engagement thereof controlled by said selector valve, and a governor controlling said selector valve, said source being connected to a reservoir for said fluid, said gearing including reverse gears, and a three-way valve operable to direct said pressurized fluid selectively to said reservoir, to the one of said clutches associated with said reverse gears, and to said selector valve, and by-pass valves to by-pass said fluid around actuating means for said clutches.

3. A hydraulic gear shift for variable speed gearing including a source of pressurized fluid connected to a selector valve, clutches operatively associated with gearing and having the selective engagement thereof controlled by said selector valve, and a governor controlling said selector valve and operatively connected with said gearing, said source being connected to a reservoir for said fluid, said gearing including reverse gears, and a three-way valve operable to direct said pressurized fluid selectively to said reservoir providing a neutral drive position of the gear shift and to the one of said clutches associated with said reverse gears and to said selector valve for forward drive positions of the gear shift, and by-pass valves to by-pass said fluid around actuating means for said clutches providing a second neutral drive position of the gear shift.

JERRY C. CHAMBERLAIN.

REFERENCES CITED

The following references are of record in the file of this patent:

UNITED STATES PATENTS

| Number | Name | Date |
| --- | --- | --- |
| 1,199,640 | Vincent | Sept. 26, 1916 |
| 1,731,076 | Maurer | Oct. 8, 1929 |
| 2,103,540 | Livermore | Dec. 28, 1937 |
| 2,283,133 | Allen et al. | May 12, 1942 |
| 2,352,212 | Lang et al. | June 27, 1944 |